(12) United States Patent  (10) Patent No.: US 9,294,886 B2
Anchan                    (45) Date of Patent:     Mar. 22, 2016

(54) EVOLVED MULTIMEDIA BROADCAST/MULTICAST SERVICES (EMBMS) GEO-LOCATION BASED GROUP CALL

(71) Applicant: QUALCOMM Incorporated, San Diego, CA (US)

(72) Inventor: Kirankumar Anchan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 233 days.

(21) Appl. No.: 14/013,024

(22) Filed: Aug. 28, 2013

(65) Prior Publication Data

US 2014/0064177 A1   Mar. 6, 2014

Related U.S. Application Data

(60) Provisional application No. 61/695,814, filed on Aug. 31, 2012.

(51) Int. Cl.
*H04W 4/08* (2009.01)
*H04L 12/18* (2006.01)
(Continued)

(52) U.S. Cl.
CPC ............... *H04W 4/08* (2013.01); *H04L 12/18* (2013.01); *H04W 4/021* (2013.01); *H04W 4/06* (2013.01); *H04W 76/002* (2013.01)

(58) Field of Classification Search
USPC ........................................................ 370/312
See application file for complete search history.

(56) References Cited

U.S. PATENT DOCUMENTS 6,404,431 B1 * 6/2002 Farmer ........................ 345/428
2007/0036118 A1 * 2/2007 Shaffer et al. ................ 370/338
(Continued)

FOREIGN PATENT DOCUMENTS

EP   1631103 A1   3/2006
EP   1703747 A1   9/2006
(Continued)

OTHER PUBLICATIONS

3GPP TR 23.768: "3rd Generation Partnership Project; Technical Specification Group Services and System Aspects; Study on architecture enhancements to support Group Communication System Enablers for LTE (GCSE_LTE) (Release 12)", 3rd Generation Partnership Project (3GPP), Mobile Competence Centre; 650, Route Des Lucioles; F-06921 Sophia-Antipolis Cedex; France, vol. SA WG2, No. V0.3.0, Aug. 2, 2013, pp. 1-34, XP050712159.

(Continued)

*Primary Examiner* — Robert M Morlan
(74) *Attorney, Agent, or Firm* — Muncy, Geissler, Olds & Lowe, P.C.

(57) ABSTRACT

The disclosure generally relates to techniques that may be used to coordinate an evolved multimedia broadcast/multicast services (eMBMS) geo-location based group call. More particularly, an eMBMS bearer may be established to support a group call based on a mapping among eMBMS network components that service a geographic area selected by an originator associated with the group call (e.g., an area that the call originator defines according to latitude and longitude coordinates, a selected region on a map that displays available group members in the selected region, network identifications, etc.). The group call may then be initiated over the established eMBMS bearer using network group identifiers associated with the call originator and one or more group members present in the selected geographic area and unicast service with a dedicated link to group members located outside the selected geographic area may be established to include such group members in the group call.

29 Claims, 13 Drawing Sheets

(51) Int. Cl.
*H04W 4/06* (2009.01)
*H04W 4/02* (2009.01)
*H04W 76/00* (2009.01)

(56) References Cited

U.S. PATENT DOCUMENTS

| | | |
|---|---|---|
| 2007/0281722 A1 | 12/2007 | Gao |
| 2008/0004038 A1 | 1/2008 | Dunko |
| 2010/0248742 A1* | 9/2010 | Song et al. ............... 455/456.1 |
| 2012/0003969 A1* | 1/2012 | Anderson et al. ......... 455/414.2 |
| 2012/0170501 A1 | 7/2012 | Drozt et al. |
| 2012/0170502 A1 | 7/2012 | Korus et al. |
| 2012/0172028 A1 | 7/2012 | Korus et al. |
| 2013/0007287 A1* | 1/2013 | Chu et al. ..................... 709/227 |
| 2013/0064160 A1* | 3/2013 | Newberg ............ H04W 76/0002 370/312 |

FOREIGN PATENT DOCUMENTS

| | | |
|---|---|---|
| EP | 1879336 A1 | 1/2008 |
| EP | 2068522 A1 | 6/2009 |
| EP | 2456237 A1 | 5/2012 |
| EP | 2482513 A1 | 8/2012 |
| EP | 2487873 A1 | 8/2012 |
| WO | 2012167841 A1 | 12/2012 |
| WO | 2013101834 | 7/2013 |

OTHER PUBLICATIONS

Alcatel-Lucent et al., "Group communications solution" 3GPP Draft; S2-132220 Was S2-131718 GCSELTE, 3rd Generation Partnership Project (3GPP), Mobile Competence Centre; 650, Route Deslucioles; F-06921 Sophia-Antipolis Cedex; France, vol. SA WG2, No. Busan, South Korea; 20130527-20130531 May 31, 2013, pp. 12, XP050709366.

International Search Report and Written Opinion—PCT/US2013/057420—ISAEP—Mar. 6, 2014.

ZTE: "MuSe with Configurable Geographic Service Area", 3GPP Draft; S2-132920 (Was S2-132506) Muse With Configurable Geographic Service Area-R2, 3rd Generation Partnership Project (3GPP), Mobile Competence Centre; 650, Route Des Lucioles; F-06921 Sophia, vol. SA WG2, No. Valencia, Spain; 20130715-20130719, Jul. 18, 2013, pp. 8, XP050726247.

* cited by examiner

EVOLVED MULTIMEDIA BROADCAST/MULTICAST SERVICES (EMBMS) GEO-LOCATION BASED GROUP CALL

PRIORITY CLAIM UNDER 35 U.S.C. §119

The present application for patent claims the benefit of U.S. Provisional Patent Application Ser. No. 61/695,814, entitled "EVOLVED MULTIMEDIA BROADCAST/MULTICAST SERVICES (eMBMS) GEO-LOCATION BASED GROUP CALL," filed Aug. 31, 2012, assigned to the assignee hereof, which is expressly incorporated herein by reference in its entirety.

TECHNICAL FIELD

The present disclosure generally relates to wireless communications, and more particularly, to techniques that may support group communications on broadcast and multicast services in a cellular communication system.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users (e.g., a news broadcast). A multicast service is a service that may be received by a group of users (e.g., a subscription video service). A unicast service is a service intended for a specific user (e.g., a voice call). Group communications can be implemented using either unicast, broadcast, multicast or a combination of each. As the group becomes larger it is generally more efficient to use multicast services. However, for group communication services that require low latency and a short time to establish the group communication, the setup time of conventional multicast channels can be a detriment to system performance. For example, per the current evolved multimedia broadcast/multicast services (eMBMS) standard, the bearers for multicast calls are typically set up statically or semi-statically (i.e., the bearers need to be established before the call starts). Consequently, the target geographical area associated with the multicast calls has to be identified, the network components have to be connected, and the group member list needs to be pre-provisioned before the call starts, which results in a static group experience and does not permit dynamic call setup.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one exemplary aspect, a call originator may select a geographic area associated with a group communication to occur over evolved multimedia broadcast/multicast services (eMBMS), wherein the selected geographic area may be designated according to latitude and longitude coordinates, a sector identification, a Public Land Mobile Network (PLMN) identifier, or the like to define participants in the geographic area. In one embodiment, the selected geographic area may be delivered to an application server that maps the geographic area to network components and uses operations, administration and maintenance (OAM) messages to set up bearer signals. Furthermore, the group communication may be initiated upon completing the bearer signals setup, wherein a selected group of users may be pre-provisioned with a pool of temporary mobile group identities (TMGIs) for ad hoc group calling.

According to another exemplary aspect, a method for coordinating an eMBMS group call may comprise, among other things, receiving a selected geographic area associated with a group call at an application server, wherein a call originator may define the selected geographic area through one or more inputs to a user interface associated with a user equipment (e.g., according to one or more of latitude and longitude coordinates, a sector identification, a PLMN identification, a displayed area on a map that may identify available group members in the displayed region, etc.), and wherein the method may further comprise establishing an eMBMS bearer to support the group call in response to receiving the selected geographic area from the call originator based on a discovered mapping among eMBMS network components that service the selected geographic area. For example, in one embodiment, establishing the eMBMS bearer may comprise determining that one or more group members present in the selected geographic area fall under a coverage area associated with an eNode B (eNB) based on the discovered mapping and sending a request to establish the eMBMS bearer to a broadcast multicast service center (BM-SC) in the selected geographic area, wherein the BM-SC may establish the eMBMS bearer within a Mobility Management Entity (MME) mapped to the eNB. Additionally, in one embodiment, the method may further comprise initiating the group call over the established eMBMS bearer with one or more group members present in the selected geographic area, wherein the group call may be initiated using a network group identifier associated with the call originator and network group identifiers associated with the one or more group members present in the selected geographic area (e.g., via distributing network group identifiers associated with the call originator and the one or more group members present in the selected geographic area to enable ad hoc group calling in the selected geographic area). In one embodiment, the application server may provide location information to the call originator, wherein the location information may allow the call originator to identify the selected geographic area and the one or more group members present in the selected geographic area, or the application server may alternatively (or additionally) provide location information and a preselected geographic area, wherein the call originator may accept or modify the preselected geographic area and the one or more group members present in the preselected geographic area. Furthermore, in response to identifying one or more group members located outside the selected geographic area, the method may further comprise establishing unicast service with a dedicated link to the one or more group members located outside the selected geographic area in order to include the one or more group members located outside the selected geographic area in the group call.

According to another exemplary aspect, an apparatus for coordinating an eMBMS group call may comprise means for receiving a selected geographic area associated with a group call, wherein a call originator may define the selected geographic area through one or more inputs to a user interface associated with a user equipment and means for establishing an eMBMS bearer to support the group call in response to receiving the selected geographic area from the call originator based on a discovered mapping among eMBMS network components that service the selected geographic area. For example, in one embodiment, the means for establishing the eMBMS bearer may comprise means for determining that one or more group members present in the selected geographic area fall under a coverage area associated with an eNB based on the discovered mapping and means for sending a request to establish the eMBMS bearer to a BM-SC in the selected geographic area, wherein the BM-SC may establish the eMBMS bearer within an MME mapped to the eNB. Additionally, in one embodiment, the apparatus may further comprise means for initiating the group call over the established eMBMS bearer with one or more group members present in the selected geographic area, wherein the group call may be initiated using a network group identifier associated with the call originator and network group identifiers associated with the one or more group members present in the selected geographic area. In one embodiment, the apparatus may comprise means for providing location information to the call originator, wherein the location information may allow the call originator to identify the selected geographic area and the one or more group members present in the selected geographic area, or the apparatus may alternatively (or additionally) comprise means for providing location information and a preselected geographic area to the call originator, wherein the call originator may accept or modify the preselected geographic area and the one or more group members present in the preselected geographic area. Furthermore, the apparatus may further comprise means for establishing unicast service with a dedicated link to one or more identified group members that are located outside the selected geographic area in order to include the one or more group members located outside the selected geographic area in the group call.

According to another exemplary aspect, an apparatus may comprise one or more processors configured to receive a selected geographic area associated with a group call from a call originator and to establish an eMBMS bearer to support the group call in response to receiving the selected geographic area from the call originator, wherein the selected geographic area is defined through one or more inputs to a user interface associated with a user equipment, and wherein the eMBMS bearer is established based on a discovered mapping among eMBMS network components that service the selected geographic area and a memory coupled to the one or more processors.

According to another exemplary aspect, a computer-readable storage medium may have computer-executable instructions that may be used to coordinate an eMBMS group call recorded thereon, wherein executing the computer-executable instructions on one or more processors may cause the one or more processors to receive a selected geographic area associated with a group call from a call originator, wherein the selected geographic area is defined through one or more inputs to a user interface associated with a user equipment, and wherein executing the computer-executable instructions on the one or more processors may further cause the one or more processors to establish an eMBMS bearer to support the group call in response to receiving the selected geographic area from the call originator based on a discovered mapping among eMBMS network components that service the selected geographic area.

According to another exemplary aspect, a method for coordinating an eMBMS group call may comprise requesting, from a BM-SC, a network group identifier associated with a group in a Multicast/Broadcast over Single Frequency Network (MBSFN) area, establishing an eMBMS bearer to support a group call in the MBSFN area, transmitting the network group identifier associated with the group to a call originator in the MBSFN area in response to receiving a registration message from the call originator, and sending one or more downlink transmissions associated with the group call to the call originator over the established eMBMS bearer. Additionally, in one embodiment, the method may further comprise using point-to-point service or point-to-multipoint service to send the one or more downlink transmissions associated with the group call over the established eMBMS bearer and/or sending one or more downlink transmissions associated with the group call over a unicast downlink bearer. As such, the call originator may monitor a network to determine availability associated with the one or more transmissions corresponding to the network group identifier, initiate the group call with one or more members using one or more unicast uplink bearers, and indicate the availability associated with the one or more transmissions corresponding to the network group identifier in group setup signaling.

According to another exemplary aspect, an apparatus may comprise means for requesting a network group identifier associated with a group in an MBSFN area from a BM-SC, means for establishing an eMBMS bearer to support a group call in the MBSFN area, means for transmitting the network group identifier associated with the group to a call originator in the MBSFN area in response to receiving a registration message from the call originator, and means for sending one or more downlink transmissions associated with the group call to the call originator over the established eMBMS bearer. For example, in one embodiment, the apparatus may comprise a receiver configured to receive the registration message from the call originator, one or more processors configured to request the network group identifier from the BM-SC and establish the eMBMS bearer to support the group call, and a transmitter configured to transmit the network group identifier associated with the group to the call originator and send the one or more downlink transmissions associated with the group call to the call originator over the established eMBMS bearer.

According to another exemplary aspect, a computer-readable storage medium may have computer-executable instructions that may be used to coordinate an eMBMS group call recorded thereon, wherein executing the computer-executable instructions on one or more processors may cause the one or more processors to request a network group identifier associated with a group in an MBSFN area from a BM-SC, establish an eMBMS bearer to support a group call in the MBSFN area, transmit the network group identifier associated with the group to a call originator in the MBSFN area in response to receiving a registration message from the call originator, and send one or more downlink transmissions associated with the group call to the call originator over the established eMBMS bearer.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
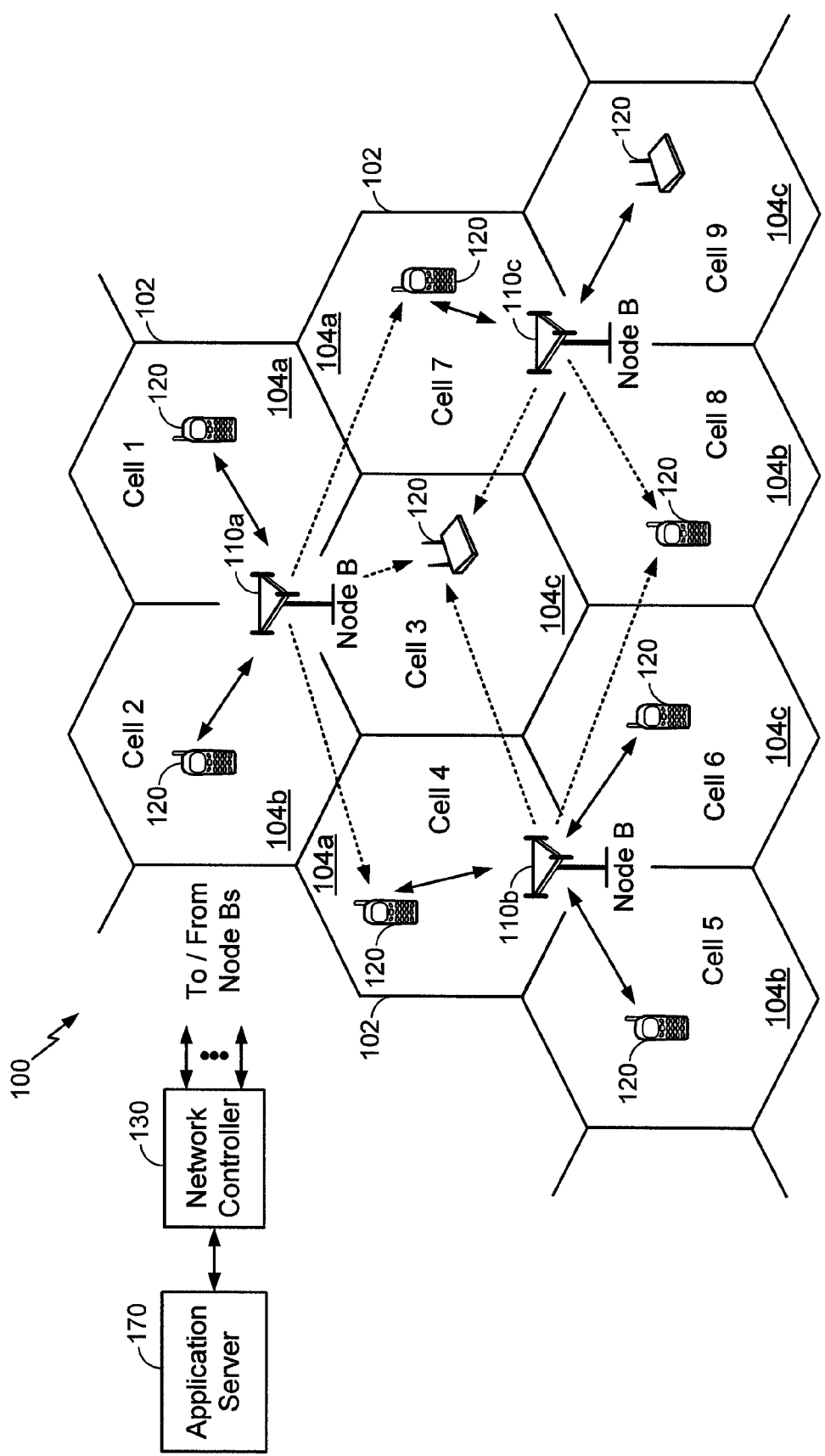
FIG. 1 illustrates an exemplary wireless communication system according to one aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation. Further, as used herein the term group communication, push-to-talk, or similar variations are meant to refer to a server arbitrated service between two or more devices.

The terminology used herein is for the purpose of describing particular aspects only and is not intended to be limiting of aspects of the disclosure. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system or other suitable access network. The communication system 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas (e.g., three smaller areas 104a, 104b and 104c). Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B (e.g., for broadcast and/or multicast services). The terms "UE" and "user" are used interchangeably herein.

Network controller 130 may couple to multiple Node Bs to provide coordination and control for the Node Bs under its control, and to route data for terminals served by these Node Bs. The communication system 100 shown in FIG. 1 may also include other network entities not shown in FIG. 1. Further, as illustrated network controller may be operably coupled to an application server 170 to provide group communication services to the various UEs 120 through communication system 100. It will be appreciated that there can be many other network and system entities that can be used to facilitate communications between the UEs and servers and information outside of the access network. Accordingly, the various aspects disclosed herein are not limited to the specific arrangement or elements detailed in the various figures.

Figure 2:
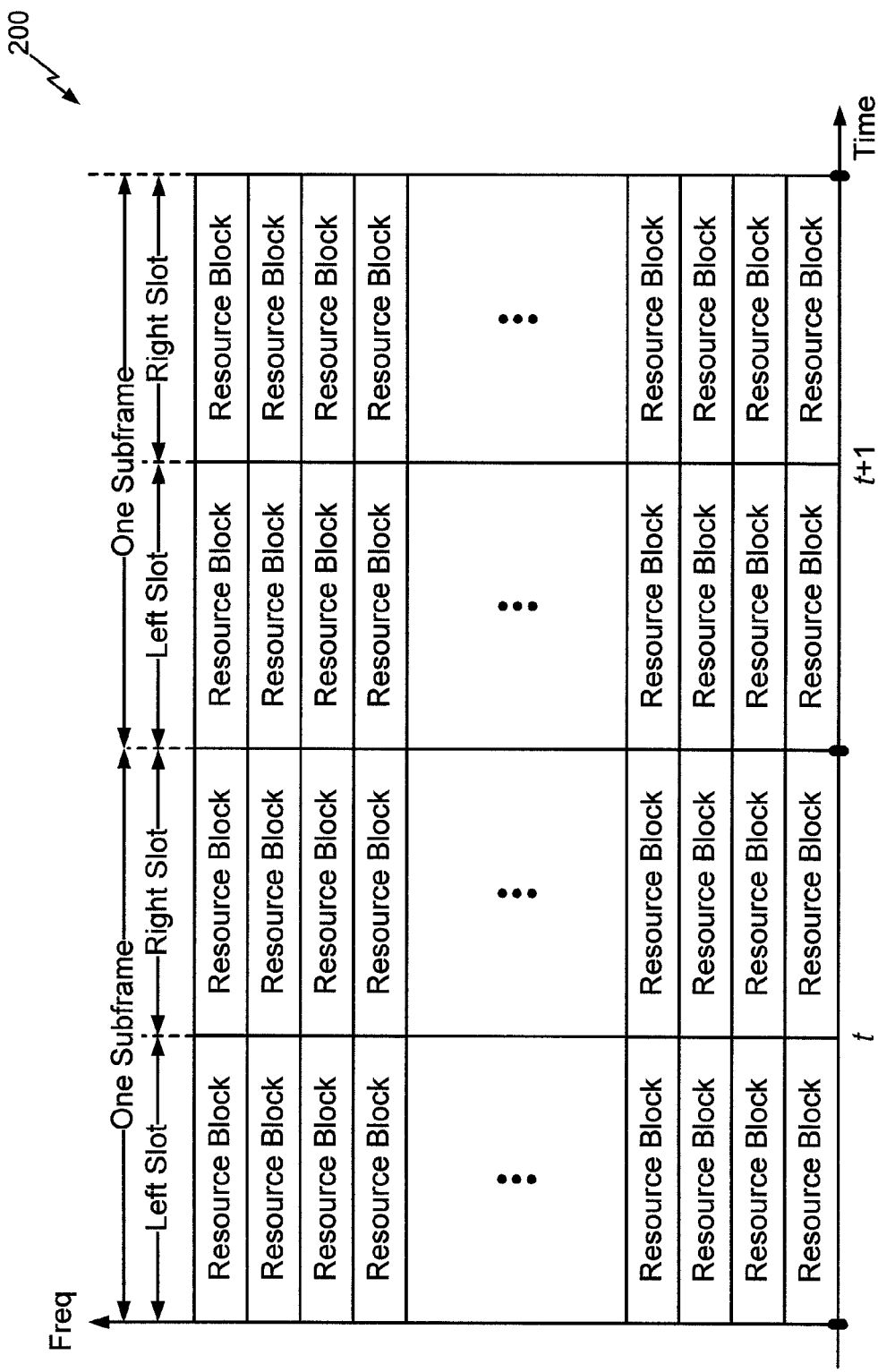
FIG. 2 illustrates an example transmission structure according to one aspect of the disclosure.

FIG. 2 shows an exemplary transmission structure 200 that may be used for the downlink in communication system 100. The transmission timeline may be partitioned into units of radio frames. Each radio frame may have a predetermined duration (e.g., 10 milliseconds (ms)) and may be partitioned into 10 sub-frames. Each sub-frame may include two slots, and each slot may include a fixed or configurable number of symbol periods (e.g., six or seven symbol periods).

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (eMBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
|---|---|---|---|
| Broadcast Control Channel | BCCH | L | Carry system information. |
| Broadcast Channel | BCH | T | Carry master system Information. |
| eMBMS Traffic Channel | MTCH | L | Carry configuration information for eMBMS services. |
| Multicast Channel | MCH | T | Carry the MTCH and MCCH. |
| Downlink Shared Channel | DL-SCH | T | Carry the MTCH and other logical channels. |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH. |
| Physical Downlink Control Channel | PDCCH | P | Carry control information for the DL-SCH. |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
|---|---|---|
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:

Content for broadcast or multicast services can be transmitted synchronously across multiple cells.

Radio resources for broadcast and multicast services are allocated by an MBMS Coordinating Entity (MCE), which may be logically located above the Node Bs.

Content for broadcast and multicast services is mapped on the MCH at a Node B.

Time division multiplexing (e.g., at sub-frame level) of data for broadcast, multicast, and unicast services.

The single-cell mode may have the following characteristics:

Each cell transmits content for broadcast and multicast services without synchronization with other cells.

Radio resources for broadcast and multicast services are allocated by the Node B.

Content for broadcast and multicast services is mapped on the DL-SCH.

Data for broadcast, multicast, and unicast services may be multiplexed in any manner allowed by the structure of the DL-SCH.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance.

Figure 3A:
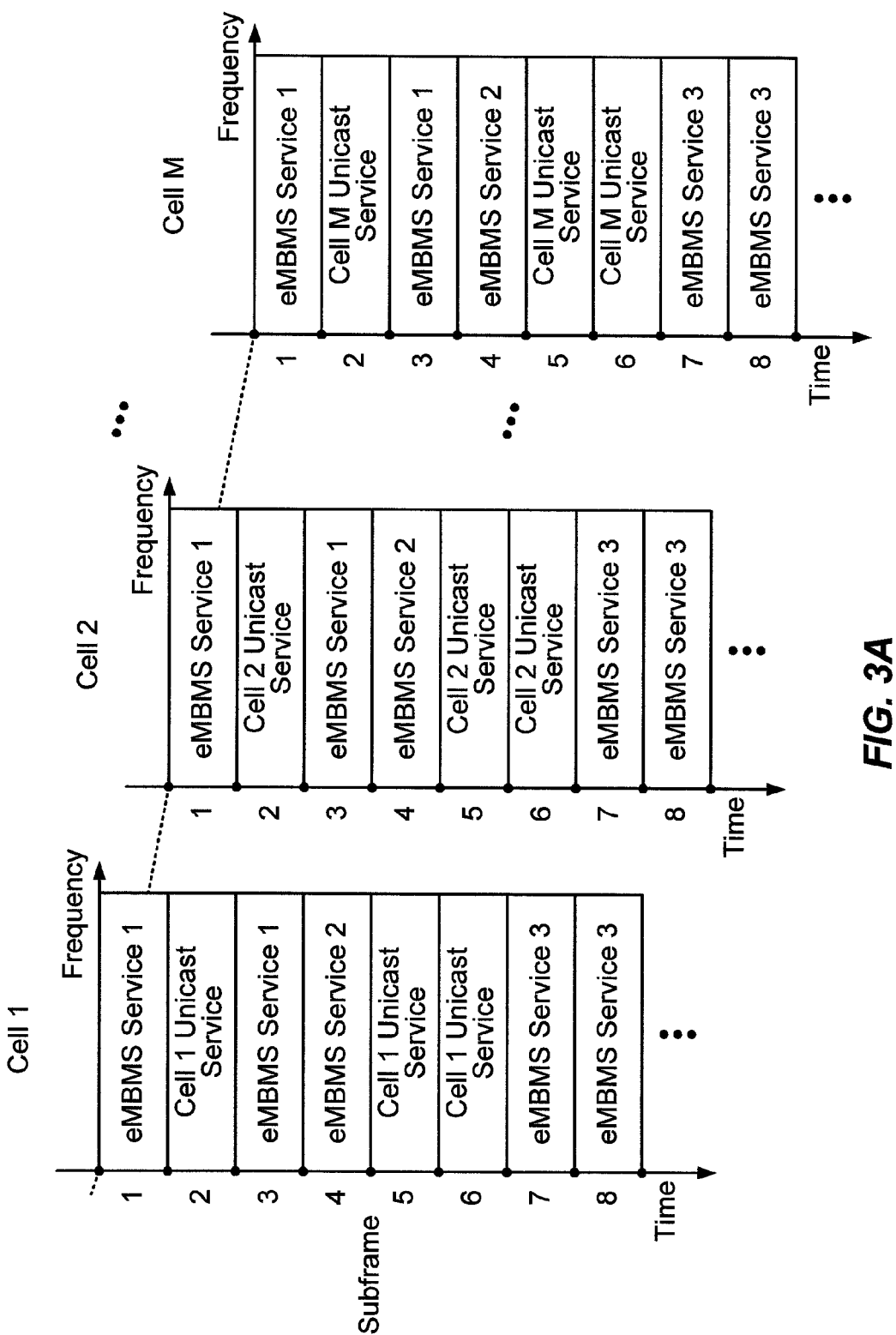
FIG. 3A illustrates exemplary transmissions of different services in a multi-cell mode according to one aspect of the disclosure.

FIG. 3A shows exemplary transmissions of eMBMS and unicast services by M cells 1 through M in the multi-cell mode, where M may be any integer value. For each cell, the horizontal axis may represent time, and the vertical axis may represent frequency. In one design of eMBMS, which is assumed for much of the description below, the transmission time line for each cell may be partitioned into time units of sub-frames. In other designs of eMBMS, the transmission time line for each cell may be partitioned into time units of other durations. In general, a time unit may correspond to a sub-frame, a slot, a symbol period, multiple symbol periods, multiple slots, multiple sub-frames, etc.

In the example shown in FIG. 3A, the M cells transmit three eMBMS services 1, 2 and 3. All M cells transmit eMBMS service 1 in sub-frames 1 and 3, eMBMS service 2 in sub-frame 4, and eMBMS service 3 in sub-frames 7 and 8. The M cells transmit the same content for each of the three eMBMS services. Each cell may transmit its own unicast service in sub-frames 2, 5 and 6. The M cells may transmit different contents for their unicast services.

Figure 3B:
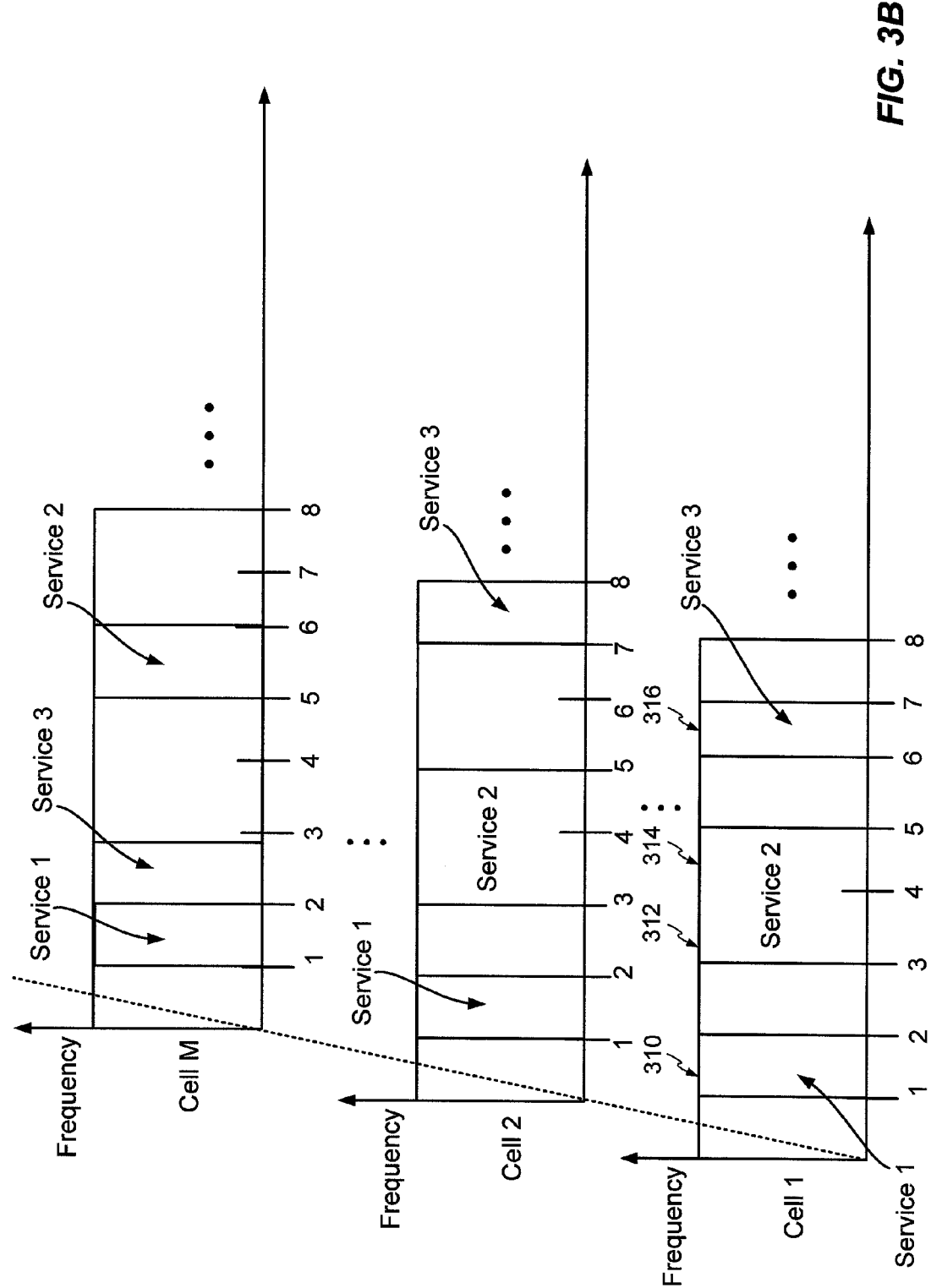
FIG. 3B illustrates exemplary transmissions of different services in a single-cell mode according to one aspect of the disclosure.

FIG. 3B shows example transmissions of eMBMS and unicast services by M cells in the single-cell mode. For each cell, the horizontal axis may represent time, and the vertical axis may represent frequency. In the example shown in FIG. 3B, the M cells transmit three eMBMS services 1, 2 and 3. Cell 1 transmits eMBMS service 1 in one time frequency block 310, eMBMS service 2 in a time frequency blocks 312 and 314, and eMBMS service 3 in one time frequency blocks 316. Similarly, other cells transmit services 1, 2 and 3 as shown in the FIG. 3B.

In general, an eMBMS service may be sent in any number of time frequency blocks. The number of sub-frames may be dependent on the amount of data to send and possibly other factors. The M cells may transmit the three eMBMS services 1, 2 and 3 in time frequency blocks that may not be aligned in time and frequency, as shown in FIG. 3B. Furthermore, the M cells may transmit the same or different contents for the three eMBMS services. Each cell may transmit its own unicast service in remaining time frequency resources not used for the three eMBMS services. The M cells may transmit different contents for their unicast services.

FIGS. 3A and 3B show example designs of transmitting eMBMS services in the multi-cell mode and the single-cell mode. eMBMS services may also be transmitted in other manners in the multi-cell and single-cell modes (e.g., using time division multiplexing (TDM)).

As noted in the foregoing, eMBMS services can be used to distribute multicast data to groups and could be useful in group communication systems (e.g., Push-to-Talk (PTT) calls). Conventional applications on eMBMS have a separate service announcement/discovery mechanism. Further, communications on pre-established eMBMS flows are always on even on the air interface. Power saving optimization must be applied to put the UE to sleep when a call/communication is not in progress. This is typically achieved by using out of band service announcements on unicast or multicast user plane data. Alternatively application layer paging channel like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub-frame cannot be used for unicast traffic. Thus, the total 5 MHz bandwidth will be consumed for the sub-frame for instances when application layer paging is scheduled without any other data.

Figure 4:
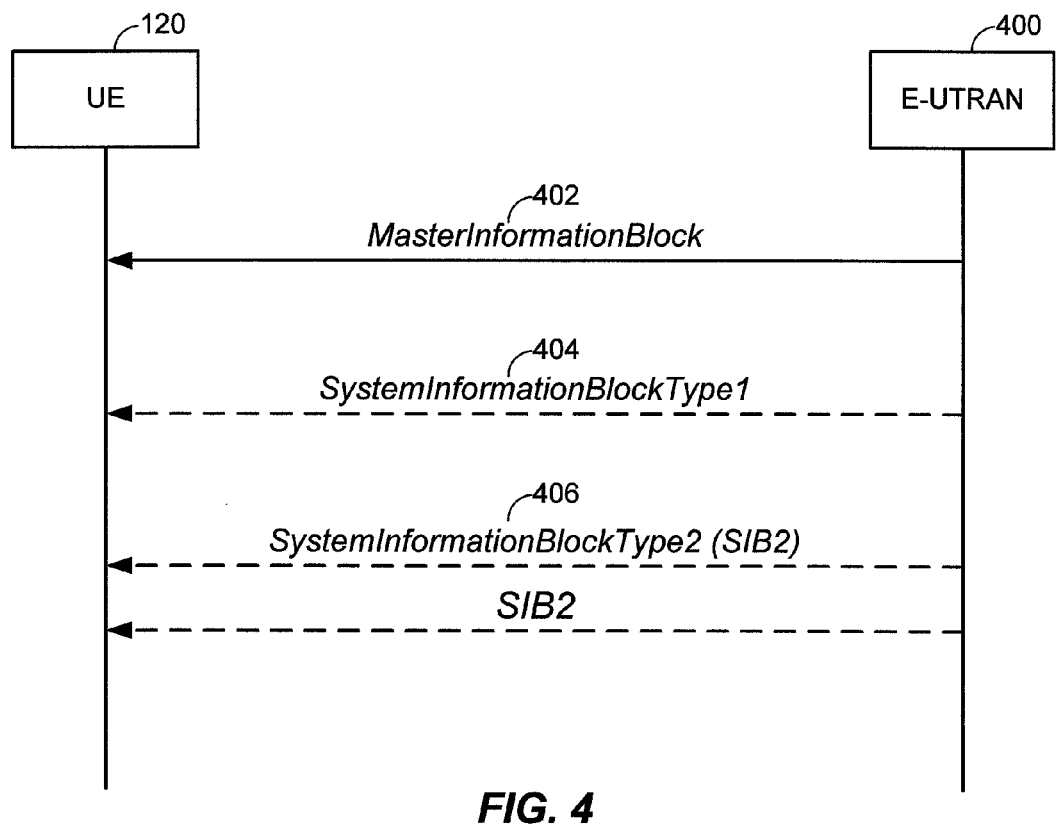
FIG. 4 illustrates an exemplary communication between a user equipment (UE) and an evolved universal terrestrial radio access network (E-UTRAN) according to one aspect of the disclosure.

Referring to FIG. 4, system information is provided by radio resource control (RRC), and is structured in master information blocks (MIBs) and system information blocks (SIBs). A MIB 402 is transmitted in fixed location time slots and includes parameters to aid the UE 120 in locating a SIB Type 1 (SIB1) message 404 scheduled on the DL-SCH (e.g., DL bandwidth and system frame number). The SIB1 message 404 contains information relevant to scheduling the other system information and information on access to a cell. The other SIBs are multiplexed in system information messages. A SIB Type 2 (SIB2) message 406 contains resource configuration information that is common to all UEs 120 and information on access barring. The evolved universal terrestrial RAN (E-UTRAN) 400 controls user access by broadcasting access class barring parameters in a SIB2 message 406, and the UE 120 performs actions according to the access class in its universal subscriber identity module (USIM).

All UEs that are members of access classes one to ten are randomly allocated mobile populations, defined as access classes 0 to 9. The population number is stored in the SIM/USIM. In addition, UEs may be members of one or more of five special categories (access classes 11 to 15) also held in the SIM/USIM. The standard defines these access classes as follows (3GPP TS 22.011, Section 4.2):

Class 15—PLMN Staff;
Class 14—Emergency Services;
Class 13—Public Utilities (e.g. water/gas suppliers);
Class 12—Security Services; and
Class 11—For PLMN Use.

A SIB2 message contains the following parameters for access control:

For regular users with Access Class 0 to 9, the access is controlled by ac-BarringFactor and ac-BarringTime parameters in the SIB2 message.

For users initiating emergency calls (AC 10) the access is controlled by the ac-BarringForEmergency parameter, indicating whether access barring is enforced or not enforced.

For UEs with AC 11 to 15, the access is controlled by the ac-BarringForSpecialAC parameter, indicating whether access barring is enforced or not enforced.

A UE is allowed to perform access procedures when the UE is a member of at least one access class that corresponds to the permitted classes as signaled over the air interface.

The UEs generate a random number to pass the "persistent" test in order for the UE to gain access. To gain access, a UE random number generator's outcome needs to be lower than the threshold set in the ac-BarringFactor. By setting the ac-BarringFactor to a lower value, the access from regular users is restricted. The users with access class 11 to 15 can gain access without any restriction.

Figure 5A:
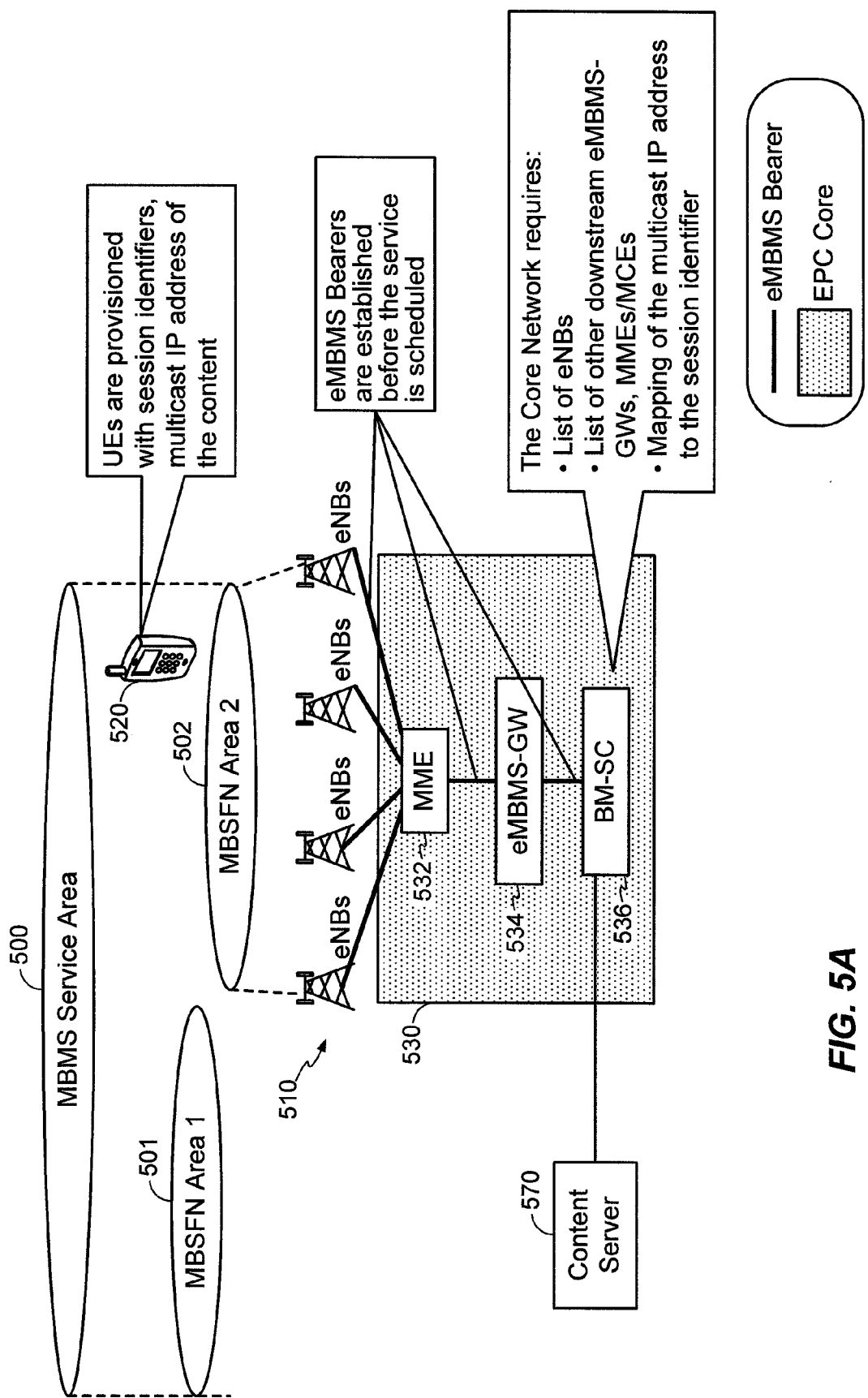
FIGS. 5A and 5B illustrate additional wireless communication systems that can support broadcast/multicast services according to one aspect of the disclosure.

FIG. 5A is another illustration of a wireless network that can implement evolved multimedia broadcast/multicast services (eMBMS) or MBMS services, which are used interchangeably herein. An MBMS service area 500 can include multiple MBSFN areas (e.g., MBSFN Area 1 501 and MBSFN Area 2 502). Each MBSFN area can be supported by one or more eNode Bs (eNBs) 510, which are coupled to a core network 530. Core network 530 can include various elements (e.g., Mobility Management Entity (MME) 532, eMBMS gateway (eMBMS-GW) 534, broadcast multicast service center (BM-SC) 536) to facilitate controlling and distributing the content from content server 570 (which may include an application server, such as the application server 170 shown in FIG. 1, etc.) to the MBMS service area 500. The core network 530 may require a list of eNBs 510, other downstream eMBMS-GWs 534, MMEs 532, and/or other elements (e.g., MCEs) within the network and a mapping of the multicast IP address to the session identifier. UE 520 within the network can be provisioned with session identifiers and multicast IP address of the content sent to it. Typically a MME 532 is a key control node for the LTE access network. It is responsible for idle mode UE tracking and paging procedure including retransmissions. It is involved in the bearer activation/deactivation process and is also responsible for choosing a serving gateway (S-GW) for a UE at the initial attach and at time of intra-LTE handover involving core network 530 node relocation and the MME 532 is also responsible for authenticating the user. The MME 532 can also check the authorization of the UE to camp on the service provider's Public Land Mobile Network (PLMN) and enforces UE roaming restrictions. The MME 532 is the termination point in the network for ciphering/integrity protection for Non Access Stratum (NAS) signaling and handles the security key management. The MME 532 also provides the control plane function for mobility between LTE and 2G/3G access networks with S3 interface terminating at the MME 532.

Figure 5B:
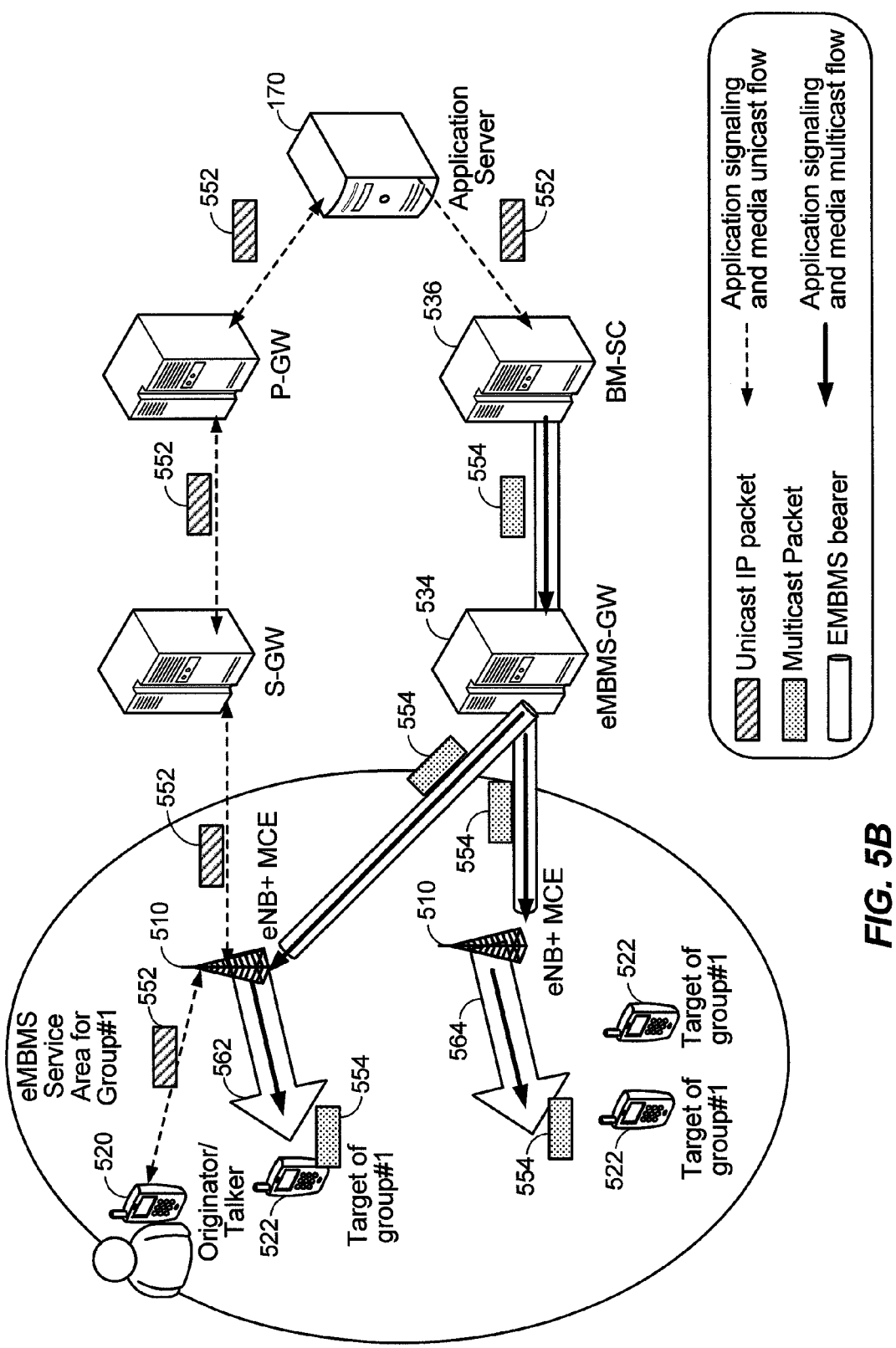

FIG. 5B is another illustration of a wireless network that can implement multimedia broadcast/multicast services (MBMS) as disclosed herein. In the illustrated network, an application server 170 (e.g., a PTT server) can serve as the content server 570. The application server 170 can communicate media in unicast packets 552 to the network core where the content can be maintained in a unicast configuration and transmitted as unicast packets to a given UE 520 (e.g., an originator or talker) or can be converted through the BM-SC to multicast packets 554, which can then be transported to target UEs 522. For example, a PTT call can be initiated by UE 520 by communicating with application server 170 via unicast packets 552 over a unicast channel. It will be noted that for the call originator/call talker both the application signaling and media are communicated via the unicast channel on the uplink or the reverse link. The application server 170 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved packet system (EPS) bearer will be established (and persistently on) between the BM-SC 536, eMBMS-GW 534, eNBs 510 and target UEs 522.

In accordance with various aspects disclosed herein some of the downlink channels related to eMBMS will be further discussed, which include.

MCCH: Multicast Control Channel;
MTCH: Multicast Traffic Channel;
MCH: Multicast Channel; and
PMCH: Physical Multicast Channel.

It will be appreciated that multiplexing of eMBMS and unicast flows are realized in the time domain only. The MCH is transmitted over MBSFN in specific sub-frames on physical layer. MCH is a downlink only channel. A single transport block is used per sub-frame. Different services (MTCHs) can be multiplexed in this transport block.

In LTE, the control and data traffic for multicast is delivered over MCCH and MTCH, respectively. The Medium Access Control Protocol Data Units (MAC PDUs) for the UEs indicate the mapping of the MTCH and the location of the particular MTCH within a sub-frame. An MCH Scheduling Information (MSI) MAC control element is included in the first sub-frame allocated to the MCH within the MCH scheduling period to indicate the position of each MTCH and unused sub-frames on the MCH. For eMBMS user data, which is carried by the MTCH logical channel, MSI periodically provides at lower layers (e.g., MAC layer information) the information on decoding the MTCH. The MSI scheduling can be configured and, according to this aspect, is scheduled prior to the MTCH sub-frame interval.

To achieve low latency and reduce control signaling, one eMBMS flow (e.g., flows 562 and 564 in FIG. 5B) can be activated for each service area. Depending on the data rate, multiple multicast flows can be multiplexed on a single slot. PTT UEs (targets) can ignore and "sleep" between scheduled sub-frames and reduce power consumption when no unicast data is scheduled for the UE. The MBSFN sub-frame can be shared by groups in the same MBSFN service area. MAC layer signaling can be leveraged to "wake-up" the application layer (e.g., PTT application) for the target UEs.

Aspects of the disclosure can use two broadcast streams, each a separate eMBMS flow over an LTE broadcast flow, with its own application level broadcast stream and its own (multicast IP address) for each defined broadcast region (e.g., a subset of sectors within the network). These regions may be separate, or they may overlap.

Figure 6A:
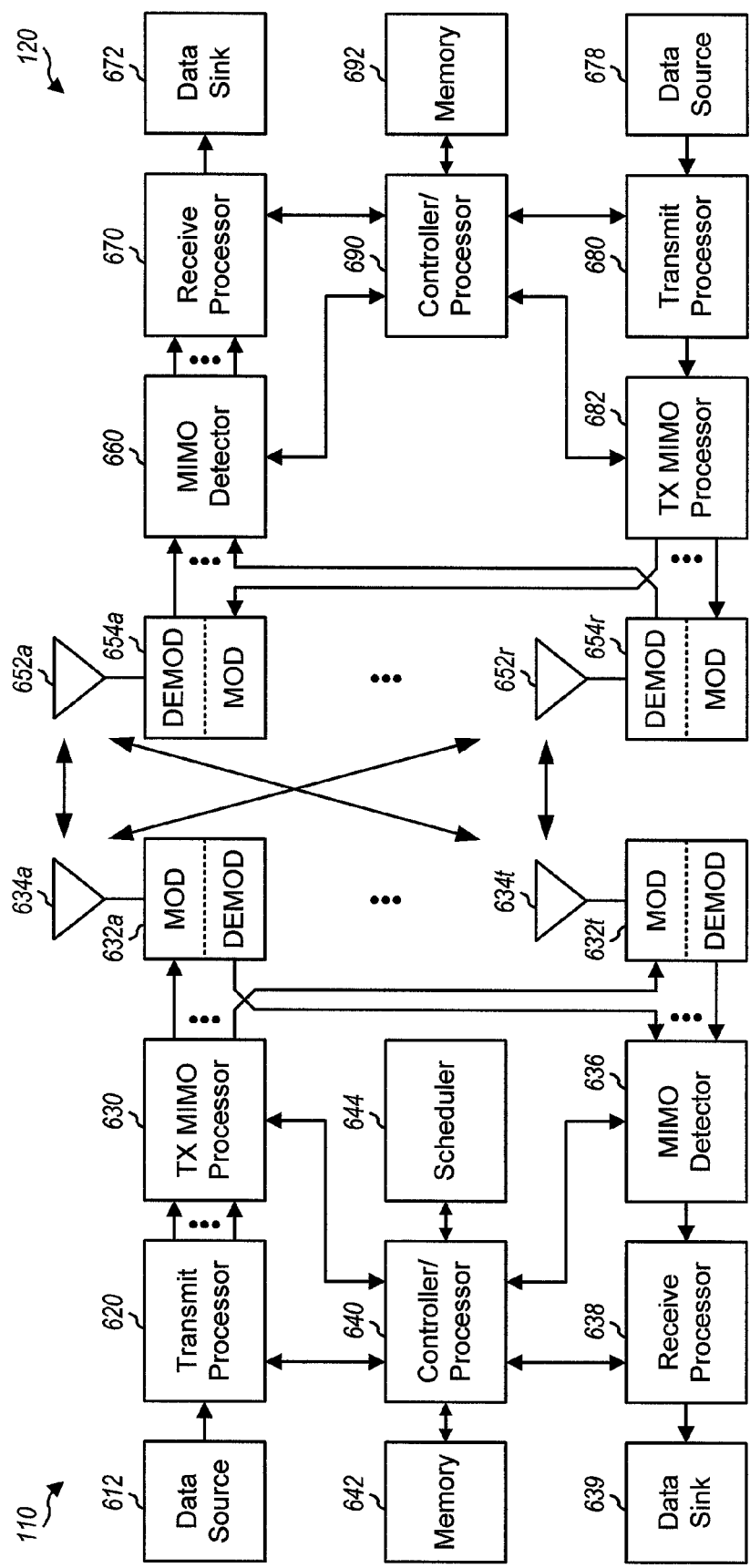
FIG. 6A illustrates an exemplary block diagram of a design of an eNode B and a user equipment (UE) according to one aspect of the disclosure.

FIG. 6A illustrates a block diagram of an exemplary design of an eNode B 110 and UE 120, which may be one of the eNBs and one of the UEs discussed herein in relation to the various embodiments. In this design, Node B 110 is equipped with T antennas 634a through 634t, and UE 120 is equipped with R antennas 652a through 652r, where in general T is greater than or equal to 1 and R is greater than or equal to 1.

At Node B 110, a transmit processor 620 may receive data for unicast services and data for broadcast and/or multicast services from a data source 612 (e.g., directly or indirectly from application server 170). Transmit processor 620 may process the data for each service to obtain data symbols. Transmit processor 620 may also receive scheduling information, configuration information, control information, system information and/or other overhead information from a controller/processor 640 and/or a scheduler 644. Transmit processor 620 may process the received overhead information and provide overhead symbols. A transmit (TX) multiple-input multiple-output (MIMO) processor 630 may multiplex the data and overhead symbols with pilot symbols, process (e.g., precode) the multiplexed symbols, and provide T output symbol streams to T modulators (MOD) 632a through 632t. Each modulator 632 may process a respective output symbol stream (e.g., for OFDM) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At UE 120, antennas 652a through 652r may receive the downlink signals from Node B 110 and provide received signals to demodulators (DEMOD) 654a through 654r, respectively. Each demodulator 654 may condition (e.g., filter, amplify, downconvert, and digitize) a respective received signal to obtain received samples and may further process the received samples (e.g., for OFDM) to obtain received symbols. A MIMO detector 660 may receive and process the received symbols from all R demodulators 654a through 654r and provide detected symbols. A receive processor 670 may process the detected symbols, provide decoded data for UE 120 and/or desired services to a data sink 672, and provide decoded overhead information to a controller/processor 690. In general, the processing by MIMO detector 660 and receive processor 670 is complementary to the processing by TX MIMO processor 630 and transmit processor 620 at Node B 110.

On the uplink, at UE 120, data from a data source 678 and overhead information from a controller/processor 690 may be processed by a transmit processor 680, further processed by a TX MIMO processor 682 (if applicable), conditioned by modulators 654a through 654r, and transmitted via antennas 652a through 652r. At Node B 110, the uplink signals from UE 120 may be received by antennas 634, conditioned by demodulators 632, detected by a MIMO detector 636, and processed by a receive processor 638 to obtain the data and overhead information transmitted by UE 120.

Controllers/processors 640 and 690 may direct the operation at Node B 110 and UE 120, respectively. Scheduler 644 may schedule UEs for downlink and/or uplink transmission, schedule transmission of broadcast and multicast services, and provide assignments of radio resources for the scheduled UEs and services. Controller/processor 640 and/or scheduler 644 may generate scheduling information and/or other overhead information for the broadcast and multicast services.

Controller/processor 690 may implement processes for the techniques described herein. Memories 642 and 692 may store data and program codes for Node B 110 and UE 120, respectively. Accordingly, group communications in the eMBMS environment can be accomplished in accordance with the various embodiments disclosed herein, while still remaining compliant with the existing standards.

Figure 6B:
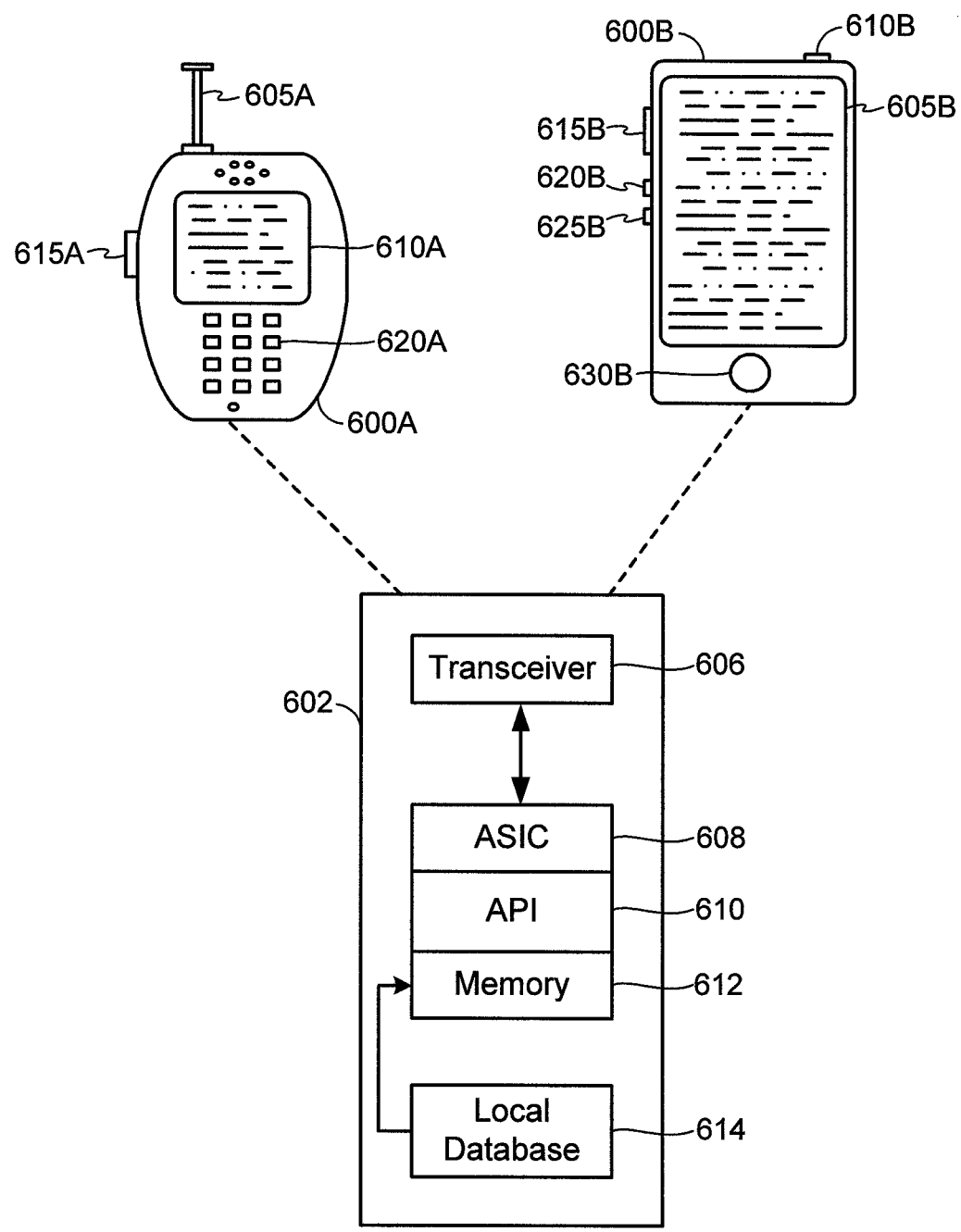
FIG. 6B illustrates exemplary UEs according to one aspect of the disclosure.

FIG. 6B illustrates additional exemplary UEs in accordance with aspects of the disclosure. Referring to FIG. 6B, UE 600A is illustrated as a calling telephone and UE 600B is illustrated as a touchscreen device (e.g., a smart phone, a tablet computer, etc.). As shown in FIG. 6B, an external casing of UE 600A is configured with an antenna 605A, display 610A, at least one button 615A (e.g., a PTT button, a power button, a volume control button, etc.) and a keypad 620A among other components, as is known in the art. Also, an external casing of UE 600B is configured with a touchscreen display 605B, peripheral buttons 610B, 615B, 620B and 625B (e.g., a power control button, a volume or vibrate control button, an airplane mode toggle button, etc.), at least one front-panel button 630B (e.g., a Home button, etc.), among other components, as is known in the art. While not shown explicitly as part of UE 600B, the UE 600B can include one or more external antennas and/or one or more integrated antennas that are built into the external casing of UE 600B, including but not limited to Wi-Fi antennas, cellular antennas, satellite position system (SPS) antennas (e.g., global positioning system (GPS) antennas), and so on.

While internal components of UEs such as the UEs 600A and 600B can be embodied with different hardware configurations, a basic high-level UE configuration for internal hardware components is shown as platform 602 in FIG. 6B. The platform 602 can receive and execute software applications, data and/or commands transmitted from the RAN 120 that may ultimately come from the core network 140, the Internet 175 and/or other remote servers and networks (e.g., application server 170, web URLs, etc.). The platform 602 can also independently execute locally stored applications without RAN interaction. The platform 602 can include a transceiver 606 operably coupled to an application specific integrated circuit (ASIC) 608, or other processor, microprocessor, logic circuit, or other data processing device. The ASIC 608 or other processor executes the application programming interface (API) 610 layer that interfaces with any resident programs in the memory 612 of the wireless device. The memory 612 can be comprised of read-only memory (ROM) or random-access memory (RAM), electrically erasable programmable ROM (EEPROM), flash cards, or any memory common to computer platforms. The platform 602 also can include a local database 614 that can store applications not actively used in memory 612, as well as other data. The local database 614 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 600A, 600B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 608, memory 612, API 610 and local database 614 may all be used cooperatively to load, store and execute the various functions disclosed herein and thus the logic to perform these functions may be distributed over various elements. Alternatively, the functionality could be incorporated into one discrete component. Therefore, the features of the UEs 600A and 600B in FIG. 6B are to be considered merely illustrative and the disclosure is not limited to the illustrated features or arrangement.

The wireless communication between the UEs 600A and/or 600B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 7:
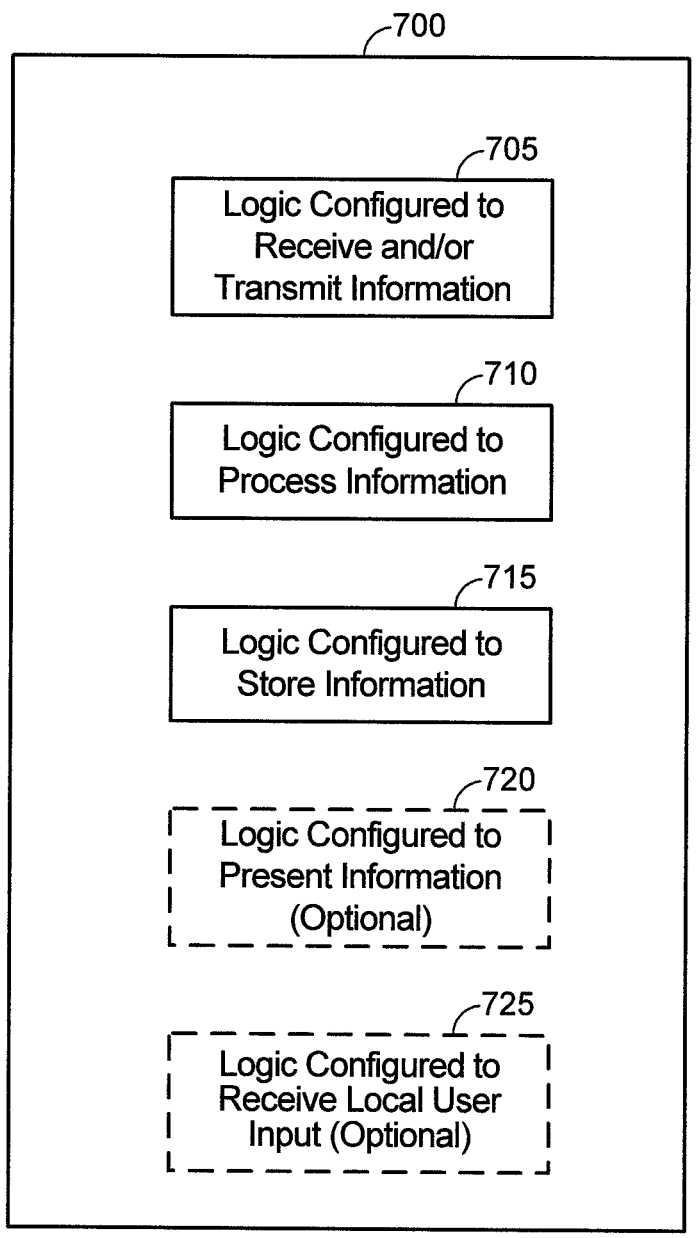
FIG. 7 illustrates an exemplary communication device that includes logic configured to perform functionality according to one aspect of the disclosure.

FIG. 7 illustrates a communication device 700 that includes logic configured to perform functionality. The communication device 700 can correspond to any of the above-noted communication devices, including but not limited to UEs 120, 600A, 600B, Node Bs or base stations 110, network controller 130 (e.g., a radio network controller (RNC) or base station controller (BSC)), a packet data network end-point (e.g., SGSN, GGSN, a Mobility Management Entity (MME) in LTE, etc.), application server 170, etc. Thus, communication device 700 can correspond to any electronic device that is configured to communicate with (or facilitate communication with) one or more other entities over a network.

Referring to FIG. 7, the communication device 700 includes logic configured to receive and/or transmit information 705. In an example, if the communication device 700 corresponds to a wireless communications device (e.g., UE 120, UE 600A, UE 600B, Node B 110, etc.), the logic configured to receive and/or transmit information 705 can include a wireless communications interface (e.g., Bluetooth, Wi-Fi, 2G, 3G, 4G, LTE, etc.) such as a wireless transceiver and associated hardware (e.g., an RF antenna, a MODEM, a modulator and/or demodulator, etc.). In another example, the logic configured to receive and/or transmit information 705 can correspond to a wired communications interface (e.g., a serial connection, a USB or Firewire connection, an Ethernet connection through which the Internet 175 can be accessed, etc.). Thus, if the communication device 700 corresponds to some type of network-based server (e.g., application server 170, etc.), the logic configured to receive and/or transmit information 705 can correspond to an Ethernet card, in an example, that connects the network-based server to other communication entities via an Ethernet protocol. In a further example, the logic configured to receive and/or transmit information 705 can include sensory or measurement hardware by which the communication device 700 can monitor its local environment (e.g., an accelerometer, a temperature sensor, a light sensor, an antenna for monitoring local RF signals, etc.). The logic configured to receive and/or transmit information 705 can also include software that, when executed, permits the associated hardware of the logic configured to receive and/or transmit information 705 to perform its reception and/or transmission function(s). However, the logic configured to receive and/or transmit information 705 does not correspond to software alone, and the logic configured to receive and/or transmit information 705 relies at least in part upon hardware to achieve its functionality.

Referring to FIG. 7, the communication device 700 further includes logic configured to process information 710. In an example, the logic configured to process information 710 can include at least a processor. Example implementations of the type of processing that can be performed by the logic configured to process information 710 includes but is not limited to performing determinations, establishing connections, making selections between different information options, performing evaluations related to data, interacting with sensors coupled to the communication device 700 to perform measurement operations, converting information from one format to another (e.g., between different protocols such as .wmv to .avi, etc.), and so on. For example, the processor included in the logic configured to process information 710 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 710 can also include software that, when executed, permits the associated hardware of the logic configured to process information 710 to perform its processing function(s). However, the logic configured to process information 710 does not correspond to software alone, and the logic configured to process information 710 relies at least in part upon hardware to achieve its functionality.

Referring to FIG. 7, the communication device 700 further includes logic configured to store information 715. In an example, the logic configured to store information 715 can include at least a non-transitory memory and associated hardware (e.g., a memory controller, etc.). For example, the non-transitory memory included in the logic configured to store information 715 can correspond to RAM memory, flash memory, ROM memory, EPROM memory, EEPROM memory, registers, hard disk, a removable disk, a CD-ROM, or any other form of storage medium known in the art. The logic configured to store information 715 can also include software that, when executed, permits the associated hardware of the logic configured to store information 715 to perform its storage function(s). However, the logic configured to store information 715 does not correspond to software alone, and the logic configured to store information 715 relies at least in part upon hardware to achieve its functionality.

Referring to FIG. 7, the communication device 700 further optionally includes logic configured to present information 720. In an example, the logic configured to present information 720 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 700. For example, if the communication device 700 corresponds to UE 600A or UE 600B as shown in FIG. 6B, the logic configured to present information 720 can include the display 610A of UE 600A or the touchscreen display 605B of UE 600B. In a further example, the logic configured to present information 720 can be omitted for certain communication devices, such as network communication devices that do not have a local user (e.g., network switches or routers, remote servers, etc.). The logic configured to present information 720 can also include software that, when executed, permits the associated hardware of the logic configured to present information 720 to perform its presentation function(s). However, the logic configured to present information 720 does not correspond to software alone, and the logic configured to present information 720 relies at least in part upon hardware to achieve its functionality.

Referring to FIG. 7, the communication device 700 further optionally includes logic configured to receive local user input 725. In an example, the logic configured to receive local user input 725 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 700. For example, if the communication device 700 corresponds to UE 600A or UE 600B as shown in FIG. 6B, the logic configured to receive local user input 725 can include the keypad 620A, any of the buttons 615A or 610B through 625B, the touchscreen display 605B, etc. In a further example, the logic configured to receive local user input 725 can be omitted for certain communication devices, such as network communication devices that do not have a local user (e.g., network switches or routers, remote servers, etc.). The logic configured to receive local user input 725 can also include software that, when executed, permits the associated hardware of the logic configured to receive local user input 725 to perform its input reception function(s). However, the logic configured to receive local user input 725 does not correspond to software alone, and the logic configured to receive local user input 725 relies at least in part upon hardware to achieve its functionality.

Referring to FIG. 7, while the configured logics of 705 through 725 are shown as separate or distinct blocks in FIG. 7, it will be appreciated that the hardware and/or software by which the respective configured logic performs its functionality can overlap in part. For example, any software used to facilitate the functionality of the configured logics of 705 through 725 can be stored in the non-transitory memory associated with the logic configured to store information 715, such that the configured logics of 705 through 725 each performs their functionality (i.e., in this case, software execution) based in part upon the operation of software stored by the logic configured to store information 705. Likewise, hardware that is directly associated with one of the configured logics can be borrowed or used by other configured logics from time to time. For example, the processor of the logic configured to process information 710 can format data into an appropriate format before being transmitted by the logic configured to receive and/or transmit information 705, such that the logic configured to receive and/or transmit information 705 performs its functionality (i.e., in this case, transmission of data) based in part upon the operation of hardware (i.e., the processor) associated with the logic configured to process information 710.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic."

Figure 8:
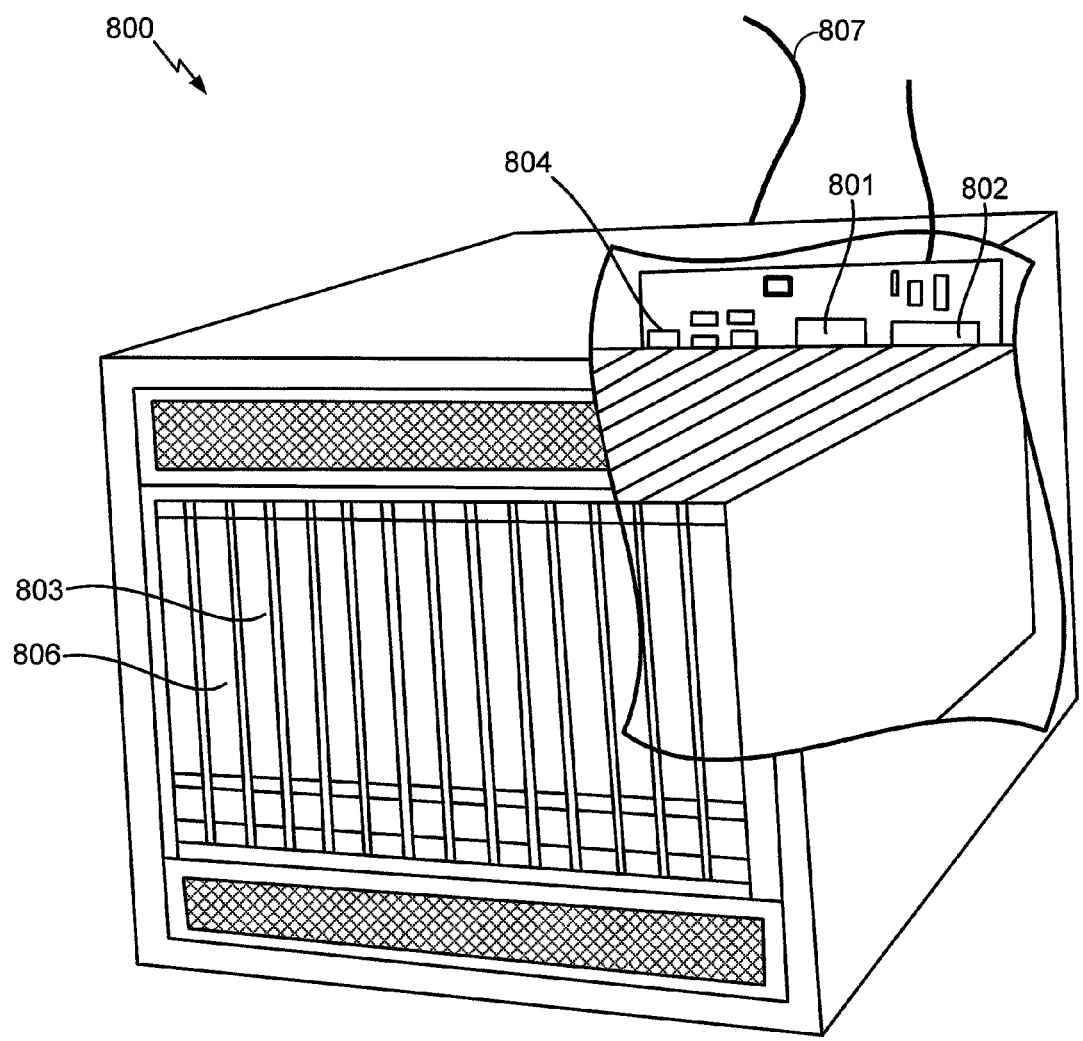
FIG. 8 illustrates an exemplary server according to one aspect of the disclosure.

The various aspects of the disclosure may be implemented on any of a variety of commercially available server devices, such as server 800 illustrated in FIG. 8. In an example, the server 800 may correspond to one example configuration of the application server 170 described above. In FIG. 8, the server 800 includes a processor 801 coupled to volatile memory 802 and a large capacity nonvolatile memory, such as a disk drive 803. The server 800 may also include a floppy disc drive, compact disc (CD) or DVD disc drive 806 coupled to the processor 801. The server 800 may also include network access ports 804 coupled to the processor 801 for establishing data connections with a network 807, such as a local area network coupled to other broadcast system computers and servers or to the Internet. In context with FIG. 7, it will be appreciated that the server 800 of FIG. 8 illustrates one example implementation of the communication device 700, whereby the logic configured to transmit and/or receive information 705 corresponds to the network access points 804 used by the server 800 to communicate with the network 807, the logic configured to process information 710 corresponds to the processor 801, and the logic configuration to store information 715 corresponds to any combination of the volatile memory 802, the disk drive 803 and/or the disc drive 806. The optional logic configured to present information 720 and the optional logic configured to receive local user input 725 are not shown explicitly in FIG. 8 and may or may not be included therein. Thus, FIG. 8 helps to demonstrate that the communication device 700 may be implemented as a server, in addition to a UE implementation as in 605A or 605B as in FIG. 6B.

For group communication services that require low latency and a short time to establish the group communication, the setup time of conventional multicast channels can be a detriment to system performance. A conventional eMBMS system, for example, only allows static or semi-static bearer setup. In other words, the bearers need to be established before the call is started. This means that the target geographical area has to be identified and the network components be connected. Additionally, a group member list needs to be pre-provisioned, resulting in a static group experience which does not allow for dynamic call setups.

Typically, bearer sizing is performed to accommodate high traffic periods, but since the eMBMS bearers are always held in Always-on state, even during periods of inactivity, these bearers are underutilized. Moreover, the bearers take away the useable network capacity that could be used for unicast users.

The various embodiments are directed to application-server-assisted dynamic multicast bearer management in an MBMS system. The various embodiments allow a call originator to select a geographic area that includes one or more participants (by using latitude and longitude information, using sector id information, or by using Public Land Mobile Network triangulation mechanisms) to find participants in the region and allow for dynamic eMBMS geo-location based on group call.

Once the geographic region has been selected, the area information is then delivered to an application server, which may access an installed mapping of the area to network components and uses operations, administration and maintenance (OAM) messages to set up the bearers.

Figure 9:
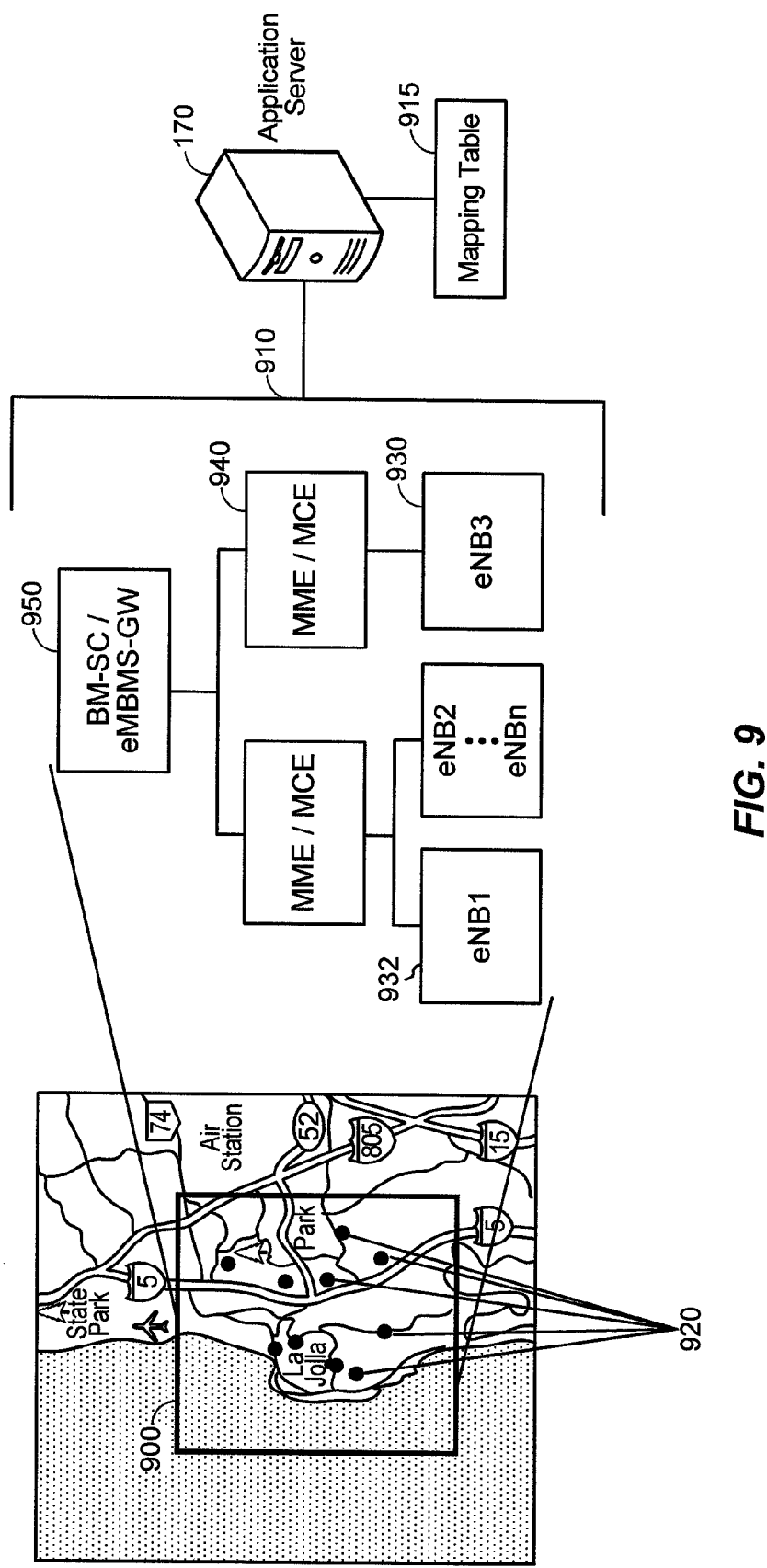
FIG. 9 illustrates an exemplary geographic area selection scheme according to one aspect of the disclosure.

For example, according to one aspect of the disclosure, FIG. 9 illustrates an exemplary geographic area selection scheme that allows for a user to select a geographic area 900 to be targeted for a broadcast communication. One exemplary embodiment illustrates the option for a call originator to select a geographic area 900 that includes one or more group members 920 in the region. The geographic area 900 can be denoted by several mechanisms, including assigning longitude and latitude coordinates, outlining a sample area 900 on a map, allocating a sector ID/cell site, or allowing the user to select a specific geographic location, such as a concert hall, a specific city block, a mall or any identifiable area or other suitable location. A certain threshold of group members 920 may already be present in the area 900, which may also be identified to the user. Furthermore, in one embodiment, the application server 170 may provide location information to the call originator, wherein the location information may allow the call originator to identify the selected geographic area 900 and the one or more group members 920 present in the area 900. In another exemplary use case, the application server 170 may preselect the geographic area 900 and provide the preselected geographic area 900 along with the location information to the call originator, wherein the call originator may then accept or modify the preselected geographic area 900 and the one or more group members 920 present therein. Once the user identifies a specific area 900, information associated with the area 900 along with a list of group members 920 present in the area 900 may be delivered to an application server 170. The group members 920 present in the area 900 may also be displayed in the sample geographic area 900 selected by the user.

Upon reception of the group members 920 and the area 900 associated with the group call, the application server 170 may perform a reverse mapping scheme of the selected area 900 (e.g., based on cell site information in the selected area 900) to determine whether a mapping table 915 already has a static mapping 910 between the eNBs 930, the MMEs/MCEs 940, and the BM-SC/eMBMS-GW 950 in the selected area 900 and to determine whether any such static mapping 910 can be used to establish a broadcast call in that area 900. Such capability determination may depend on the mapping 910 between the eNBs 930, the MMEs/MCEs 940, and the BM-SC/eMBMS-GW 950. Alternatively, the application server 170 can discover the mapping 910 between the eNBs 930, the MMEs/MCEs 940, and the BM-SC/eMBMS-GW 950 based on recent history of the eMBMS calls in response to determining that the mapping table 915 does not have an available static mapping 910, in which case the application server 170 may add the discovered mapping 910 to the mapping table 915 such that the discovered mapping 910 can be used to establish a subsequent broadcast call in the area 900. Once the application server 170 determines the network mapping 910, the application server 170 can then send a request to the BM-SC 950 to set up the bearer(s) for a broadcast communication with the specified eMBMS-GW 950, for a specified MME/MCE 940 for a specified set of eNBs 930. For example, the application server 170 may determine from the static or determined network mapping 910 that the group members fall under the coverage area of eNode B1 (eNB1) 932 and would thus request the BM-SC 950 set up the bearers within MME/MCE 940 for eNB1 932.

Additionally, to enable soft combining and provide a Multicast/Broadcast over Single Frequency Network (MBSFN) area, a few adjacent support cells like eNBn may also be activated for the specified eMBMS service. The adjacent cells are not limited to those within the MME region and can span multiple MMEs/MCEs 940 and/or eMBMS-GWs 950. For example, in one embodiment, the application server 170 may request a network group identifier such as a temporary mobile group identity (TMGI) associated with a group in the MBSFN area from the BM-SC/eMBMS-GW 950 and establish the eMBMS bearer to support the group call in the MBSFN area and then transmit the network group identifier associated with the group to the call originator in response to receiving a registration message from the call originator. As such, the application server 170 may then send one or more downlink transmissions associated with the group call to the call originator over the established eMBMS bearer and thereby enable soft combining and provide the MBSFN area for the specified eMBMS service. For example, in one embodiment, the application server 170 may use point-to-point service or point-to-multipoint service to send the one or more downlink transmissions associated with the group call over the established eMBMS bearer and the application server 170 may further send one or more downlink transmissions associated with the group call over a unicast downlink bearer (e.g., to any group members that may be located outside the selected area 900). Furthermore, the call originator may monitor the network to determine availability associated with the transmissions corresponding to the network group identifier, initiate the group call with the group members 920 using one or more unicast uplink bearers, and indicate the availability associated with the one or more transmissions corresponding to the network group identifier in group setup signaling.

Figure 10:
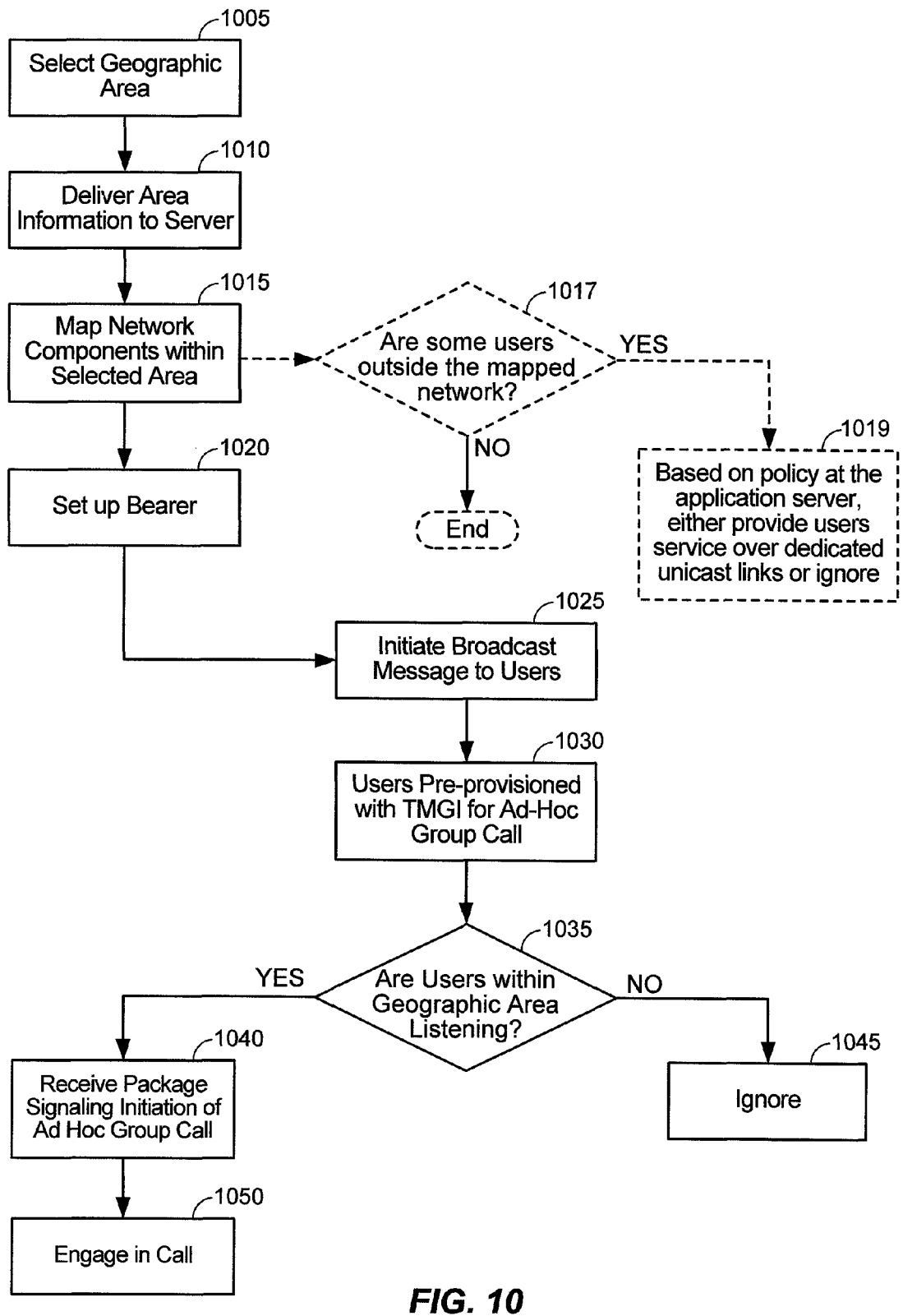
FIG. 10 illustrates an exemplary method for identifying users in a specified geographic location and engaging with identified users through a group call broadcast according to one aspect of the disclosure.

FIG. 10 illustrates another example of establishing a group call in a selected geographic area. In one embodiment a user (call originator) may select a geographic area 1005 by multiple means, including setting up longitude and latitude coordinates or selecting a specific city block, building or venue. The selection process can also be performed through a user interface (UI) integrated in the user equipment (UE) wherein the UI allows the user to display a geographic area, which can include representations of the group members on the map. The user can then select a specific geographic area that includes the various group members. In other implementations, the geographic area can be automatically generated based on the various group member locations. In one example, group members (e.g., group members 920 in FIG. 9) that are available in a specified geographic area 900 may be displayed. In another example, a group may be selected and a map containing the available group members may be generated the UI which may further allow for refining of the geographic area 900 by the user to select specific group members in more defined regions. The UI may also allow for selection of group members based on their geographic proximity prior to displaying their locations on the map for user confirmation or further refinement of the geographic area.

Referring back to FIG. 10, once a geographic area is selected by the user at block 1005, the selected geographic area is then delivered to an application server at block 1010, wherein the application server may perform a reverse mapping of the network components that support the selected geographic area at block 1015. In an optional procedure, after the reverse mapping has been determined at block 1015, the application server may determine whether one or more group members are located outside the selected area at block 1017, in which case the application server may include the group members located outside the selected area in the group call via unicast service with a dedicated link at block 1019. Alternatively, the application server may exclude the group members located the selected area from the group call at block 1019, wherein the application server may determine whether to include or exclude the group members located outside the selected area depending on optional configuration and/or policy information. Regardless of the optional unicast procedures, one or more identified BM-SCs for the selected geographic area may set up one or more eMBMS bearers to support the group call at block 1020. Once the eMBMS bearer set up is complete, the application server may initiate a broadcast message to all group members in the selected geographic area at block 1025 and pre-provision the group members with a pool of temporary mobile group identities (TMGIs) at block 1030 to facilitate detecting and establishing ad hoc broadcast calls. For example, the TMGIs may uniquely identify a multimedia broadcast/multicast service (MBMS) bearer service. Subsequently, if one or more of the targeted group members within the selected geographic area are listening at block 1035, the listening group members may receive package signaling information initiating the ad hoc group call at block 1040 and then engage in the group call at block 1050. For example, the targeted group members may include the call originator, wherein the call originator may monitor a network at block 1035 to determine availability associated with one or more transmissions corresponding to the TMGIs and then initiate the group call with other targeted group members using one or more unicast uplink bearers and indicate the availability associated with the one or more transmissions corresponding to the TMGIs in group setup signaling. Furthermore, in one embodiment, the ad hoc group call will be ignored at block 1045 with respect to any targeted group members within the selected geographic area that are not listening.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for coordinating an evolved multimedia broadcast/multicast services (eMBMS) group call, comprising:
    receiving, at an application server, a selected geographic area from a call originator, wherein the selected geographic area is defined through one or more inputs to a user interface associated with a user equipment;
    establishing an eMBMS bearer to support ad hoc group calling in the selected geographic area received from the call originator based on a discovered mapping among eMBMS network components that service the selected geographic area;
    pre-provisioning the call originator with a pool of network group identifiers that uniquely identify a multimedia broadcast/multicast service (MBMS) to facilitate establishing an ad hoc group call in the selected geographic area over the established eMBMS bearer; and
    broadcasting, to one or more group members present in the selected geographic area, a message to facilitate detecting the ad hoc group call, wherein the broadcasted message includes the pool of network group identifiers.

2. The method recited in claim 1, wherein establishing the eMBMS bearer to support the ad hoc group calling in the selected geographic area comprises:
    determining, from the discovered mapping, that the one or more group members present in the selected geographic area fall under a coverage area associated with an eNode B (eNB); and
    sending a request to establish the eMBMS bearer to a broadcast multicast service center (BM-SC) in the selected geographic area, wherein the BM-SC establishes the eMBMS bearer within a Mobility Management Entity (MME) mapped to the eNB.

3. The method recited in claim 1, further comprising:
    providing, to the call originator, location information that allows the call originator to identify the selected geographic area and the one or more group members present in the selected geographic area.

4. The method recited in claim 1, further comprising:
providing, to the call originator, location information and a preselected geographic area that allows the call originator to accept or modify the preselected geographic area and the one or more group members present in the preselected geographic area.

5. The method recited in claim 1, further comprising:
identifying one or more group members located outside the selected geographic area; and
establishing unicast service with a dedicated link to the one or more group members located outside the selected geographic area to include the one or more group members located outside the selected geographic area in the ad hoc group call.

6. The method recited in claim 1, further comprising:
distributing the pool of network group identifiers among the call originator and the one or more group members present in the selected geographic area to enable the ad hoc group calling in the selected geographic area.

7. The method recited in claim 1, wherein the pool of network group identifiers comprise at least one temporary group identifier (TMGI).

8. The method recited in claim 1, wherein the selected geographic area is defined according to one or more of latitude and longitude coordinates, a sector identification, a Public Land Mobile Network (PLMN) identification, or an area on a map.

9. The method recited in claim 1, wherein the selected geographic area comprises a selected map region having one or more available group members.

10. The method recited in claim 1, wherein the selected geographic area is defined according to one or more longitude and latitude coordinates received from the call originator.

11. An apparatus, comprising:
means for receiving a selected geographic area from a call originator, wherein the selected geographic area is defined through one or more inputs to a user interface associated with a user equipment;
means for establishing an evolved multimedia broadcast/multicast services (eMBMS) bearer to support ad hoc group calling in the selected geographic area received from the call originator based on a discovered mapping among eMBMS network components that service the selected geographic area;
means for pre-provisioning the call originator with a pool of network group identifiers that uniquely identify a multimedia broadcast/multicast service (MBMS) to facilitate establishing an ad hoc group call in the selected geographic area over the established eMBMS bearer; and
means for broadcasting, to one or more group members present in the selected geographic area, a message to facilitate detecting the ad hoc group call, wherein the broadcasted message includes the pool of network group identifiers.

12. The apparatus recited in claim 11, wherein the means for establishing the eMBMS bearer to support the ad hoc group calling in the selected geographic area comprises:
means for determining, from the discovered mapping, that the one or more group members present in the selected geographic area fall under a coverage area associated with an eNode B (eNB); and
means for sending a request to establish the eMBMS bearer to a broadcast multicast service center (BM-SC) in the selected geographic area, wherein the BM-SC establishes the eMBMS bearer within a Mobility Management Entity (MME) mapped to the eNB.

13. The apparatus recited in claim 11, further comprising:
means for providing, to the call originator, location information that allows the call originator to identify the selected geographic area and the one or more group members present in the selected geographic area.

14. The apparatus recited in claim 11, further comprising:
means for providing, to the call originator, location information and a preselected geographic area that allows the call originator to accept or modify the preselected geographic area and the one or more group members present in the preselected geographic area.

15. The apparatus recited in claim 11, further comprising:
means for identifying one or more group members located outside the selected geographic area; and
means for establishing unicast service with a dedicated link to the one or more group members located outside the selected geographic area to include the one or more group members located outside the selected geographic area in the ad hoc group call.

16. The apparatus recited in claim 11, further comprising:
means for distributing the pool of network group identifiers among the call originator and the one or more group members present in the selected geographic area to enable the ad hoc group calling in the selected geographic area.

17. The apparatus recited in claim 11, wherein the pool of network group identifiers comprise at least one temporary group identifier (TMGI).

18. The apparatus recited in claim 11, wherein the selected geographic area is defined according to one or more of latitude and longitude coordinates, a sector identification, a Public Land Mobile Network (PLMN) identification, or an area on a map.

19. The apparatus recited in claim 11, wherein the selected geographic area comprises a selected map region having one or more available group members.

20. The apparatus recited in claim 11, wherein the selected geographic area is defined according to one or more longitude and latitude coordinates received from the call originator.

21. An apparatus, comprising:
one or more processors configured to receive a selected geographic area from a call originator, to establish an evolved multimedia broadcast/multicast services (eMBMS) bearer to support ad hoc group calling in the selected geographic area received from the call originator, to pre-provision the call originator with a pool of network group identifiers that uniquely identify a multimedia broadcast/multicast service (MBMS) to facilitate establishing an ad hoc group call in the selected geographic area over the established eMBMS bearer, and to broadcast, to one or more group members present in the selected geographic area, a message that includes the pool of network group identifiers to facilitate detecting the ad hoc group call, wherein the selected geographic area is defined through one or more inputs to a user interface associated with a user equipment, and wherein the eMBMS bearer is established based on a discovered mapping among eMBMS network components that service the selected geographic area; and
a memory coupled to the one or more processors.

22. A non-transitory computer-readable storage medium having computer-executable instructions recorded thereon, wherein executing the computer-executable instructions on one or more processors causes the one or more processors to:

receive a selected geographic area from a call originator, wherein the selected geographic area is defined through one or more inputs to a user interface associated with a user equipment;

establish an evolved multimedia broadcast/multicast services (eMBMS) bearer to support ad hoc group calling in the selected geographic area received from the call originator based on a discovered mapping among eMBMS network components that service the selected geographic area;

pre-provision the call originator with a pool of network group identifiers that uniquely identify a multimedia broadcast/multicast service (MBMS) to facilitate establishing an ad hoc group call in the selected geographic area over the established eMBMS bearer; and broadcast, to one or more group members present in the selected geographic area, a message to facilitate detecting the ad hoc group call, wherein the broadcasted message includes the pool of network group identifiers.

23. A method for coordinating an evolved multimedia broadcast/multicast services (eMBMS) group call, comprising:

requesting, from a broadcast multicast service center (BM-SC), a pool of network group identifiers associated with a group in a Multicast/Broadcast over Single Frequency Network (MBSFN) area, wherein the pool of network group identifiers uniquely identify a multimedia broadcast/multicast service (MBMS);

establishing an eMBMS bearer to support a group call in the MBSFN area;

transmitting the pool of network group identifiers associated with the group to a call originator in the MBSFN area in response to receiving a registration message from the call originator;

broadcasting, to one or more group members present in the MBSFN area, a message to facilitate detecting the group call, wherein the broadcasted message includes the pool of network group identifiers; and sending one or more downlink transmissions associated with the group call to the call originator over the established eMBMS bearer.

24. The method recited in claim 23, further comprising:
using point-to-point service or point-to-multipoint service to send the one or more downlink transmissions associated with the group call over the established eMBMS bearer.

25. The method recited in claim 23, wherein the call originator monitors a network to determine availability associated with one or more transmissions corresponding to the pool of network group identifiers, initiates the group call with the one or more group members present in the MBSFN area using one or more unicast uplink bearers, and indicates the availability associated with the one or more transmissions corresponding to the pool of network group identifiers in group setup signaling.

26. The method recited in claim 23, further comprising:
sending one or more downlink transmissions associated with the group call over a unicast downlink bearer.

27. An apparatus, comprising:
means for requesting, from a broadcast multicast service center (BM-SC), a pool of network group identifiers associated with a group in a Multicast/Broadcast over Single Frequency Network (MBSFN) area, wherein the pool of network group identifiers uniquely identify a multimedia broadcast/multicast service (MBMS);

means for establishing an evolved multimedia broadcast/multicast services (eMBMS) bearer to support a group call in the MBSFN area;

means for transmitting the pool of network group identifiers associated with the group to a call originator in the MBSFN area in response to receiving a registration message from the call originator;

means for broadcasting, to one or more group members present in the MBSFN area, a message to facilitate detecting the group call, wherein the broadcasted message includes the pool of network group identifiers; and means for sending one or more downlink transmissions associated with the group call to the call originator over the established eMBMS bearer.

28. An apparatus, comprising:
a receiver configured to receive a registration message from a call originator;

one or more processors configured to request a pool of network group identifiers associated with a group in a Multicast/Broadcast over Single Frequency Network (MBSFN) area from a broadcast multicast service center (BM-SC) and to establish an evolved multimedia broadcast/multicast services (eMBMS) bearer to support a group call in the MBSFN area, wherein the pool of network group identifiers uniquely identify a multimedia broadcast/multicast service (MBMS); and a transmitter configured to transmit the pool of network group identifiers associated with the group to the call originator in response to the registration message from the call originator, to broadcast, to one or more group members present in the MBSFN area, a message to facilitate detecting the group call, wherein the broadcasted message includes the pool of network group identifiers, and to send one or more downlink transmissions associated with the group call to the call originator over the established eMBMS bearer.

29. A non-transitory computer-readable storage medium having computer-executable instructions recorded thereon, wherein executing the computer-executable instructions on one or more processors causes the one or more processors to:

request, from a broadcast multicast service center (BM-SC), a pool of network group identifiers associated with a group in a Multicast/Broadcast over Single Frequency Network (MBSFN) area, wherein the pool of network group identifiers uniquely identify a multimedia broadcast/multicast service (MBMS);

establish an evolved multimedia broadcast/multicast services (eMBMS) bearer to support a group call in the MBSFN area;

transmit the pool of network group identifiers associated with the group to a call originator in the MBSFN area in response to receiving a registration message from the call originator;

broadcast, to one or more group members present in the MBSFN area, a message to facilitate detecting the group call, wherein the broadcasted message includes the pool of network group identifiers; and send one or more downlink transmissions associated with the group call to the call originator over the established eMBMS bearer.

* * * * *